May 23, 1950 W. C. LAPPLE 2,508,762
DEVICE FOR CONTROLLING FLOW OF LIQUIDS
Filed Nov. 5, 1946

INVENTOR
WALTER C. LAPPLE
BY
Walter C. Wheeler
ATTORNEY

Patented May 23, 1950

2,508,762

UNITED STATES PATENT OFFICE 2,508,762

DEVICE FOR CONTROLLING THE FLOW OF LIQUIDS

Walter C. Lapple, Niagara Falls, N. Y., assignor to E. I. du Pont de Nemours & Company, Wilmington, Del., a corporation of Delaware Application November 5, 1946, Serial No. 707,803

4 Claims. (Cl. 222—290)

This invention relates to devices for accurately controlling the volumetric delivery of liquids, and especially to such devices which are devoid of moving parts.

It is general practice to control the volumetric flow of liquids by gate valves and other devices comprising mechanically moved gates or restrictive valves in the liquid flow line. These devices are satisfactory where the liquid does not carry solids or does not contain scale forming compounds which readily obstruct, corrode or otherwise impair the orifices and the mechanically adjusted members. It is therefore desirable to provide devices which will accurately control the flow of liquids which contain solids, such as slurries, as well as clear liquids.

Figure 2:
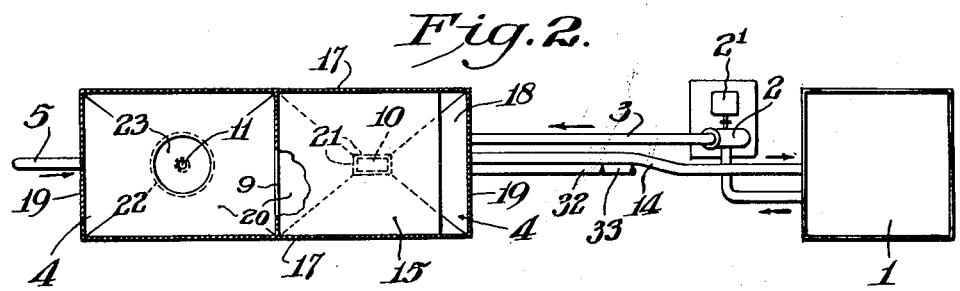

It is among the objects of the present invention to provide novel devices for the flow of liquids which can be constructed and regulated to deliver relatively accurately a predetermined volume of liquid, say without variations of more than about 5%. Another object of the invention is to provide such devices which are devoid of movable mechanical parts in the flow line for regulating the volume of liquid delivered. Another object of the invention is to provide such devices which comprise accessible devices for regulating the flow. A further object is to provide such devices which can be constructed of non-corrosive materials of metallic or non-metallic nature. Still other objects of the invention will be apparent from the following description which is made with reference to the drawing in which Fig. 1 is a side elevational view of a flow control device with parts broken away, showing connections provided for delivering a predetermined volume of liquid and connections arranged for receiving the liquid delivered, and Fig. 2 is a plan view of the device shown in Fig. 1, a part of which is in cross section taken along the line 2—2 of Fig. 1.

Figure 1:
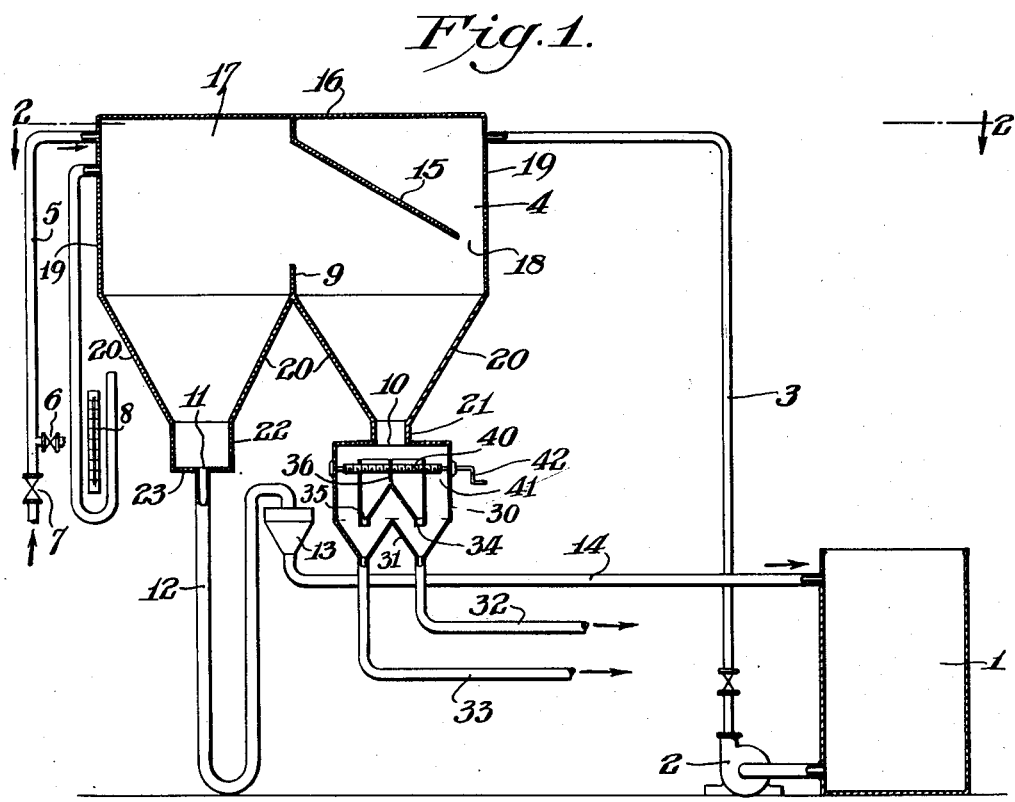

Referring to Fig. 1, the liquid, such as a slurry contained in supply tank 1 is continuously pumped by centrifugal pump 2 driven by the motor 2'. The pump 2 delivers liquor to the novel measuring apparatus through receiving pipe 3 in volume in excess of the predetermined volume to be delivered by the novel measuring device.

The measuring device comprises a closed casing having a gas tight connection in the upper walls 4 thereof with the liquid receiving pipe 3 which prevents leakage of air or gas to or from the enclosure. The enclosure of the casing or gas space is also provided with a gas tight connection with a pressure control pipe 5 which is connected with a pressure maintaining device of conventional design (not shown) for maintaining a constant pressure of gas over the liquid in the casing. A considerable range of pressures can be used over the liquid. Pressures from about that of the surrounding atmosphere to about 20 pounds gauge may desirably be maintained in the casing for most operations. For such pressures the pressure control pipe 5 is connected to a gas pump. Means for regulating the pressure may be provided in the form of a venting valve 6 in the pipe 5 which may be opened more or less depending upon the pump characteristics or adventitious gas leaks in the system. A valve 7 in the line 5 may also be used to regulate the pressure over the liquid. A gas tight connection may also be provided in the upper part of the casing for mounting a manometer or other pressure gauge for providing visual means for regulating the pressure in the casing.

The bottom or liquid-submerged part of the casing comprises two outlets which are separated by a wall terminating in an inner overflow weir 9. On one side of the weir 9, the liquid flows through the delivery orifice 10 which is proportioned to deliver a predetermined volume of liquid at a given head existing between the orifice and the top of weir 9. On the other side of the weir 9, the return liquor orifice leads to the return liquor pipe 12 which is sealed onto the bottom member of the casing by suitable means. The return liquor pipe 12 is U-shaped to provide a liquid trap or water leg to prevent leakage of gas to or from the enclosure of the casing or communication with the atmosphere. For operations where the casing is held at or above atmospheric pressure, the outer leg of strap 12 is arranged to discharge at a suitable level above the effective liquor level in the enclosure in order to prevent voiding the trap of liquor by the action of the gas pressure maintained in the enclosure.

The return liquor is discharged from the return liquor pipe to a sump 13 which empties through pipe 14 into the top of the slurry tank 1.

The casing is desirably provided with an internal baffle 15 which directs the in-coming liquor from pipe 3 in a uniform stream into the reserve liquor on the delivery orifice side of the weir 9 and prevents delivery of any liquor directly from the pipe 3 to the other side of the weir. Various modifications of the weir can be made, but the preferred form shown in the drawings comprises a baffle extending obliquely downwardly from the top member 16 of the casing and from one to the other side plate or wall member 17 of the casing. The baffle extends obliquely downwardly leaving a rectangular receiving orifice 18 emptying along the wall 4 into the reserve liquor.

A preferred form of bottom or delivery hopper for the rectangular form of device shown in the drawing comprises four obliquely disposed walls 20 converging to a centrally disposed rectangular pipe which terminates in the delivery orifice 10 of rectangular cross section, which pipe is formed by the walls 21. A similar rectangular return liquor hopper may be formed at the bottom of the tank on the return liquor side of the weir 9. This hopper may be formed like the delivery hopper or, as shown in the drawings, the side walls 20 may be shaped at their lower ends to form a cylindrical end portion 22. The rectangular return hopper pipe, however, may desirably be formed to provide a somewhat more restricted outlet than the walls 22 in order to avoid excessive pumping of circulating liquor. A desirable form consists of a plain bottom member 23 having a suitable orifice for communicating with the return liquor pipe 12. In practice the orifice 10 is desirably ample to rid the casing of liquor as fast as it spills over the baffle 9.

In operation, liquor is pumped from the supply tank 1 into the enclosure at a greater rate than the predetermined delivery rate through the delivery orifice 10 so that in normally adjusted operation, the liquor will continuously spill over the weir 9 into the return liquor hopper. In operating with positive pressure in the tank above the surrounding atmosphere, the air is pumped through pipe 5 with a pump until the desired pressure is indicated by the manometer 8. This gas pressure on the liquor in the tank is held constant in normally adjusted operation, but when more or less delivery of liquor through orifice 10 is desired for adjustment of the delivered volume, the gas pressure in the enclosure may be appropriately increased or decreased, as the case may be, in order to give a greater or smaller total head on the liquor, and a consequent variation in the delivery of liquor at the delivery orifice 10. For example, in handling a water slurry containing 10% lime, a gas pressure of 10 pounds per square inch gauge in the gas chamber provides an arrangement which responds quickly to changes in gas pressure with deliveries of 40 gallons per minute. This arrangement gave deliveries which did not vary from the predetermined delivery more than about 4%.

In process plant operations, it is sometimes desirable to route parts of the liquor delivered by the device to different destinations. Devices made in accordance with the present invention are well adapted for combining with such apparatus, one form of which is shown in the drawings. Accordingly, the liquor is delivered at the orifice 10 which is preferably of symmetrical cross section such as round, elliptical or rectangular. The stream of liquor is directed into a splitter box of known design which comprises two discharge hoppers having side walls 30 separated by a partition or U-shaped bottom 31, each being connected to separate discharge pipes 32 and 33. An apportioning device comprising a twin funnel having outlet pipes 34 and 35 which have a common inner wall 36 is disposed under delivery port 10, so that the partition 10 will direct more or less of the delivered liquor to pipe 32 as the partition 35 cuts off more or less of a delivered stream of liquid. The twin funnel is mounted on a coarsely threaded central portion 40 of the shaft 41 and projections engaging the screw cause the twin funnel to move across the delivered stream when the shaft 41 is turned. The shaft 41 is mounted in suitable bearings on the side walls of the delivery sump 30 and may be turned by a crank 42 at one end thereof.

If it is desired to deliver all of the liquor or slurry to the pipe 32, it is only necessary to propel the splitter mechanism to one side by turning the crank 42 until the partition is disposed entirely to one side of the stream delivered from orifice 10. In this position, all of the liquor is delivered to the funnel having a delivery pipe 34 and all will be delivered to the pipe 32. All of the liquor can be delivered to pipe 33 by similarly disposing the other funnel under the delivery orifice 10, and delivery may be apportioned between the pipes 32 and 33 by disposing the partition 36 in intermediate positions.

Devices made in accordance with the present invention can be readily constructed of a great variety of materials, such as metal, wood or moldable materials which have suitable resistance to acids, alkalis or to both acids and alkalis. Numerous such moldable materials are available such as the various cementitious materials, known condensation products of the phenol-formaldehyde type, hard rubber and others. Auxiliary apparatus for insuring maintenance of slurries can be mounted in the system, such as an agitator in the slurry tank 1 or in the water leg 12.

From the foregoing disclosure it will be recognized that the invention is susceptible of modification without departing from the spirit and scope thereof and it is to be understood that the invention is not restricted to the specific illustrations thereof herein set forth.

I claim:

1. A device of the kind described which comprises an enclosure having top, side and bottom walls enclosing a gas space and a space for liquid, the bottom wall of the enclosure having a delivery port in one portion opening to a delivery means and a return liquor port in another portion opening to liquor return means, a wall member in the liquor space extending from side to side of said enclosure forming a weir between said ports, means for supplying liquor to the delivery port side of said weir and flow regulating means connected with the gas space through a sidewall thereof for varying the gas pressure in said space.

2. A device of the kind described which comprises an enclosure having top, side and bottom walls enclosing a gas space and a space for liquid, the bottom wall of the enclosure having a delivery port in one portion opening to a delivery means and a return liquor port in another portion opening to liquor return means, a wall member in the liquor space extending from side to side of said enclosure forming a weir, an obliquely inclined baffle extending between the sidewalls of said gas enclosure, said baffle being terminated along a line parallel to one end wall so as to form a rectangular port above the liquor space on the delivery port side of said weir, and means for supplying liquor to the top side of said baffle.

3. A device in accordance with claim 1 in which the bottom comprises a plurality of walls obliquely and upwardly inclined from the delivery and return ports, said walls intersecting along a line between said ports, and a weir mounted along said intersecting line.

4. A device of the kind described which comprises an enclosure having top, side and bottom walls enclosing a gas space and a space for liquid, the bottom wall of the enclosure having a delivery port in one portion opening to a delivery means and a return liquor port in another portion opening to liquor return means, said delivery means comprising an enlarged enclosure having a bottom wall, and conduits leading from spaced apart openings in said bottom wall, said bottom wall having raised portions inclined upwardly from said openings, and a flow-splitting device mounted in said enlarged enclosure, said flow-splitting device comprising a plurality of receptacles, each receptacle having a lower delivery opening located for delivering material to a conduit, and means for adjustably positioning said receptacles underneath said discharge port for apportioning the flow of material among said receptacles.

WALTER C. LAPPLE.

REFERENCES CITED

The following references are of record in the file of this patent:

UNITED STATES PATENTS

| Number | Name | Date |
| --- | --- | --- |
| 536,716 | Brentlinger | Apr. 2, 1895 |
| 826,116 | Saunders | July 17, 1906 |
| 1,181,726 | Bishop | May 2, 1916 |
| 1,621,022 | Merchen | Mar. 15, 1927 |
| 1,711,783 | Hayes | May 7, 1929 |